US008948463B2

(12) United States Patent
Landa et al.

(10) Patent No.: US 8,948,463 B2
(45) Date of Patent: Feb. 3, 2015

(54) METHOD FOR ANALYZING SEISMIC DATA

(75) Inventors: Evgeny Landa, Lescar (FR); Reda Baina, Pau (FR)

(73) Assignee: Total SA, Courbevoie (FR)

( * ) Notice: Subject to any disclaimer, the term of this patent is extended or adjusted under 35 U.S.C. 154(b) by 229 days.

(21) Appl. No.: 13/702,803

(22) PCT Filed: Jun. 7, 2010

(86) PCT No.: PCT/IB2010/001942
§ 371 (c)(1),
(2), (4) Date: Dec. 7, 2012

(87) PCT Pub. No.: WO2011/154762
PCT Pub. Date: Dec. 15, 2011

(65) Prior Publication Data
US 2013/0077832 A1  Mar. 28, 2013

(51) Int. Cl.
*G06K 9/00* (2006.01)
*G01V 1/28* (2006.01)

(52) U.S. Cl.
CPC ............... *G06K 9/0063* (2013.01); *G01V 1/28* (2013.01); *G01V 2210/51* (2013.01)
USPC ........... 382/109; 382/100; 382/254; 382/275; 382/276; 382/281; 367/25; 367/53; 367/73; 702/14; 702/16

(58) Field of Classification Search
None
See application file for complete search history.

(56) References Cited

U.S. PATENT DOCUMENTS

| 6,498,989 | B1 * | 12/2002 | Pisetski et al. | 702/14 |
|---|---|---|---|---|
| 6,546,339 | B2 | 4/2003 | Bevc et al. | |
| 7,239,578 | B2 * | 7/2007 | Robinson | 367/43 |
| 7,366,054 | B1 * | 4/2008 | Wood | 367/43 |
| 7,561,491 | B2 * | 7/2009 | Robinson | 367/43 |
| 7,564,740 | B2 * | 7/2009 | Wood | 367/43 |
| 7,821,869 | B2 * | 10/2010 | Wood | 367/24 |
| 7,936,640 | B2 * | 5/2011 | Robinson | 367/38 |
| 7,948,826 | B2 * | 5/2011 | Wood | 367/47 |
| 2001/0051854 | A1 * | 12/2001 | Lailly et al. | 702/14 |
| 2010/0014384 | A1 * | 1/2010 | Colombo et al. | 367/73 |

OTHER PUBLICATIONS

Trad, Daniel, et al., "A Hybrid Linear-Hyperbolic Radon Transform," *Journal of Seismic Exploration*, vol. 9, pp. 303-318 (2001).
Landa, Evgeny, et al., "Separation, imaging, and velocity analysis of seismic diffractions using migrated dip angle gathers," *SEG Expanded Abstracts*, vol. 27, pp. 2176-2180 (2008).

(Continued)

*Primary Examiner* — Matthew Bella
*Assistant Examiner* — Jason Heidemann
(74) *Attorney, Agent, or Firm* — Patterson Thuente Pedersen, P.A.

(57) ABSTRACT

A method for analyzing seismic data by generating a post-migration common image gather in a dip angle domain from measured seismic data; detecting concave features related to reflection events in the common image gather and apexes; filtering out part of the concave features in the common image gather in a vicinity of the detected apexes; applying a hybrid Radon transform to the filtered common image gather to separate residues of the concave features from other image features related to diffraction events; and applying an inverse hybrid Radon transform to an image containing the separated features related to diffraction events to obtain a transformed common image gather in the dip angle domain.

10 Claims, 5 Drawing Sheets

(56) References Cited

OTHER PUBLICATIONS

Reshef, Moshe, et al., "Post-stack velocity analysis in the dip-angle domain using diffractions," *Geophysical Prospecting*, pp. 811-821 (2009).

Reshef, Moshe, et al., "Post-stack velocity analysis in the dip-angle domain using diffractions," *Geophysical Prospecting*, pp. 811-821 (2009), XP0026525281.

Alvarex, Gabriel, et al., "Attenuation of specular and diffracted 2D multiples in image space," *Geophysics*, vol. 72, No. 5, pp. V97-V109 (Aug. 14, 2007), XP 002625280.

Fomel, Sergey, "Applicants of plane-wave destruction filters," *Geophysics*, vol. 67, No. 6, pp. 1946-1960 (2002).

\* cited by examiner

US 8,948,463 B2

METHOD FOR ANALYZING SEISMIC DATA

PRIORITY CLAIM

The present application is a National Phase entry of PCT Application No. PCT/IB2010/001942, filed Jun. 7, 2010, the disclosure of which is hereby incorporated by reference herein in its entirety.

FIELD OF THE INVENTION

The present invention concerns a method for analyzing seismic data, and more particularly the field of geophysical prospecting in areas that contain carbonate reservoirs, i.e. where the hydrocarbon containing rocks are carbonate rocks such as limestone, for example.

BACKGROUND OF THE INVENTION

Carbonate reservoirs are difficult to exploit because of their heterogeneous nature. A major challenge in carbonate environments is therefore to map these heterogeneities which have a strong impact on oil and gas production.

In many carbonate reservoirs, the porosity of the rock (i.e. matrix porosity) is high enough to contain large amounts of oil in place, but the permeability is mainly provided by fracture corridors, not by the intrinsic nature of the rock matrix. In other reservoirs, the oil in place is found primarily in caves and conduits formed in the rock formation by infiltration and action of rain water (so-called karst formations).

Therefore, the ability to detect these heterogeneities and possibly characterize their properties, i.e. obtaining three dimensional maps of their geometry and characteristics, is essential in these environments.

To obtain images of the subsurface, the seismic method is often used, which consists in creating and sending seismic waves in the ground using sources such as explosives or vibrator trucks on land, or airguns offshore. The seismic waves penetrate the ground and get bounced, or reflected off major geological discontinuities in the subsurface. As a result, they come back to the surface, where they are recorded using arrays of three component geophones (on land), or hydrophones (offshore) which are regularly distributed to cover areas of several square kilometers.

Seismic reflections assume that local planes are large compared to the seismic wavefront. When the subsurface contains edges and short-scale heterogeneities, the wavefront undergoes diffractions rather than reflections.

Diffraction effects are typically present with carbonate reservoirs, because of the characteristics mentioned above, i.e. the presence of faults, fissures, conduits, caves etc.

The importance of diffracted waves for obtaining better images of subsurface carbonate-type reservoirs has long been recognized.

Typically, diffracted energy is one or even two orders of magnitude weaker than the reflected one and it is not easy to distinguish diffracted events in a seismic dataset or a diffraction image in a seismic image. Therefore, diffracted and reflected energy have to be separated properly.

A suitable domain for performing this separation seems to be the post-migration dip angle domain as disclosed by Landa et al. "Separation, imaging, and velocity analysis of seismic diffractions using migrated dip angle gathers", SEG Expanded Abstracts, vol. 27, pages 2176-2180, 2008. In this document, reflection and diffraction events are separated in the dip angle domain using a plane-wave-destruction method, described by Fomel: "Applications of plane-wave destruction filters", Geophysics, 67, 1946-1960, 2002, requiring accurate estimation of the velocity model used for the migration.

SUMMARY OF THE INVENTION

The present document introduces a robust method for analyzing seismic data enabling the separation of reflection and diffraction events.

It is proposed a method for analyzing seismic data, comprising:
  generating a post-migration common image gather in a dip angle domain from measured seismic data;
  detecting concave features related to reflection events in the common image gather and apexes of said concave features;
  filtering out part of the concave features in the common image gather in a vicinity of the detected apexes;
  applying a hybrid Radon transform to the filtered common image gather to separate residues of the concave features from other image features related to diffraction events;
  applying an inverse hybrid Radon transform to an image containing the separated features related to diffraction events to obtain a transformed common image gather in the dip angle domain.

According to particular embodiments, the method for analyzing seismic data comprises one or more of the following characteristics:
  the step of detecting apexes of concave features comprises:
  parameterizing each concave feature by an apex-shifted parabola; and
  searching positions corresponding to maximum semblance values for every dip angle and every depth sample;
  the hybrid Radon transform is based on a diffraction model $m_d$ and a reflection model $m_r$;
  the diffraction model $m_d$ and the reflection model $m_r$ are obtained by minimizing an objective function $$F(m_d,m_r)=\|L_d m_d+L_r m_r-d\|_2+\epsilon_d\|W_d m_d\|_2+\epsilon_r\|W_r m_r\|_2,$$

where $L_d$ and $L_r$ are diffraction and reflection Radon operators respectively, Wd and Wr are model space weights, $\epsilon_d$ and $\epsilon_r$ are diffraction and reflection measures of sparseness respectively, and d represents data of the filtered common image gather;
  minimizing the objective function F uses a limited-memory quasi-Newton method.

The invention also relates to a computer program for a system for analyzing seismic data, the program comprising instructions for performing the steps of a method as defined above when the program is executed by a computer for the system for analyzing seismic data.

BRIEF DESCRIPTION OF THE DRAWINGS

A better understanding of the invention will be facilitated by reading the following description, which is given solely by way of examples and with reference to the annexed drawings, in which.

DESCRIPTION OF EMBODIMENTS

Figure 1:
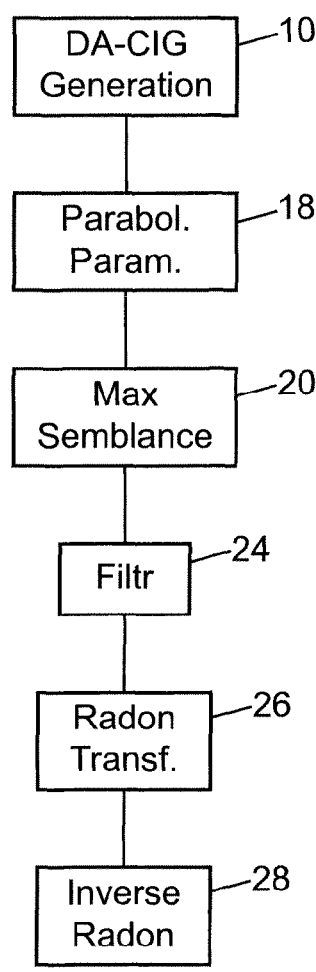
FIG. 1 is a flow chart of an embodiment of the method for analyzing seismic data.

According to FIG. 1, the method for analyzing seismic data starts with a step 10 of generating pre-stack post-migration common image gathers in a dip angle domain from seismic data conventionally measured and recorded.

A dip angle common image gather (DA-CIG) is a bi-dimensional image with a first axis representing the dip angle and a second axis representing the depth.

A DA-CIG is typically obtained for one horizontal position (x,y) by summing contributions from a number of seismic traces recorded by seismic detectors around the horizontal position (x,y). Those contributions for a depth z and a dip angle α are determined by assuming that some structure of the subsurface at position (x,y,z) has a dip angle α and bounces back seismic waves from the source. Snell's law and a model for estimating the velocity of seismic waves in the migration process determine detector positions and respective reading times for those detectors, providing contributions to the DA-CIG at (x,y) for (z,α).

If the structure at position (x,y,z) is indeed a reflector with a dip angle α, then seismic energy is specularly reflected and yields a concave feature in the DA-CIG at (x,y) which is approximately of a parabolic shape with an apex located at (z,α).

If, however, a diffractor rather than a reflector is the structure located at (x,y,z), energy is scattered in all directions from such structure, which results in a flat feature in the DA-CIG at (x,y) for the depth value z. Such flat feature is horizontal if the velocity model used for migration is an accurate estimation of the seismic velocities in the subsurface, and if the DA-CIG is located directly above the diffractor.

Figure 2:
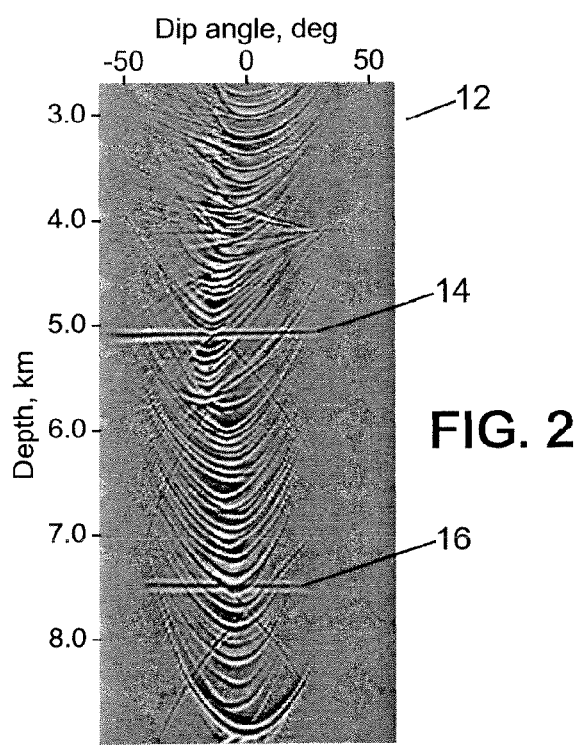
FIG. 2 shows an example of an initial common image gather in a dip angle domain.

Such a DA-CIG 12 is illustrated in FIG. 2. The illustrated DA-CIG 12 is located above two diffraction points and is computed from measured seismic data using a correct velocity model.

When viewing a DA-CIG 12, two kinds of features can thus be distinguished. The first kind consists in concave features and the second kind consists in flat features. The concave features are related to reflection events and the flat features are related to diffraction events.

For instance, two horizontal features 14, 16 appear in the common image gather of FIG. 2. Both horizontal features are related to both diffraction points in the subsurface.

The purpose of the remaining steps of the flow chart of FIG. 1 is to eliminate the reflection events illustrated by concave features in the common image gather.

As the summation of DA-CIGs obtained for different horizontal positions produces a seismic image of the subsurface, an image of a reflector is formed by a constructive summation of these DA-CIGs in a vicinity of the apexes of the concave features, in the form of smiles, related to said reflector. Thus, in order to eliminate reflection events, it is necessary to subtract a part of the concave features in the DA-CIGs located in a vicinity of the apexes of the concave features.

For this, each concave feature in the generated DA-CIG is parameterized in 18 by an apex-shifted parabola.

Then, in 20, positions corresponding to maximum semblance values for every dip angle and every depth sample are searched.

Then, the maximum semblance value for every depth is picked using an automatic picking procedure with regularization. As a result, a curve corresponding to the positions of the concave features apexes for each depth sample is obtained.

Figure 3:
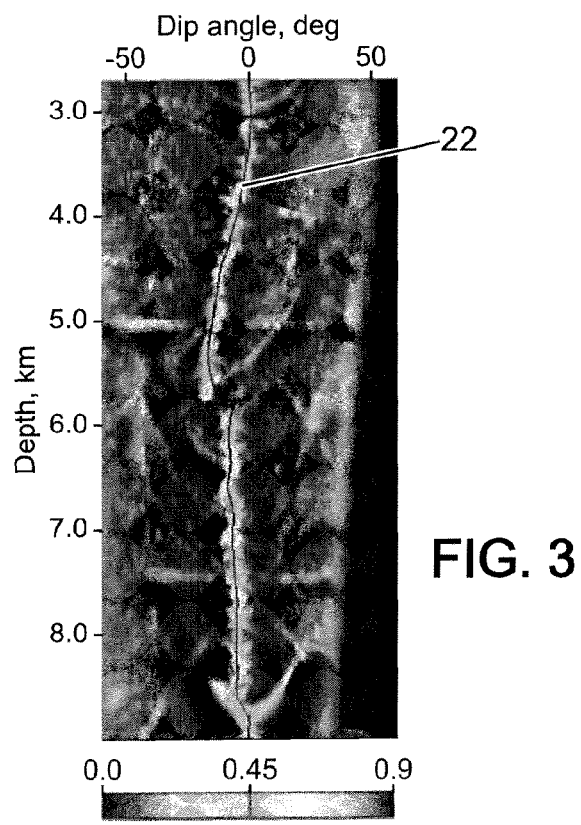
FIG. 3 shows a semblance section of the initial common image gather of FIG. 2.

This processing carried on the DA-CIG of FIG. 2 results in a curve 22, illustrated in FIG. 3, representing said concave features apexes.

In 24, a part of the concave features in a vicinity of the detected apexes is filtered out. In this way, a part of the reflection events is eliminated.

Figure 4:
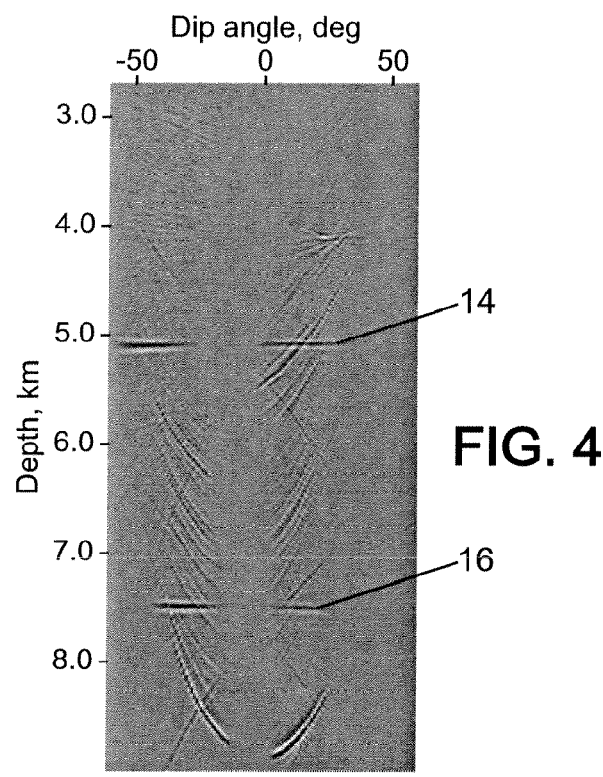
FIG. 4 shows a filtered common image gather obtained from the initial common image gather of FIG. 2.

FIG. 4 illustrates the filtered image gather obtained from the DA-CIG of FIG. 2 after step 24.

Since reflections on the DA-CIGs have a concave shape regardless of the migration velocity, as showed by Landa et al. "Separation, imaging, and velocity analysis of seismic diffractions using migrated dip angle gathers", SEG Expanded Abstracts, vol. 27, pages 2176-2180, 2008, the above described procedure (steps 18, 20 and 24) is efficient even for the case of an inaccurate velocity model.

However, unlike reflection events, the shape of features related to diffraction events in a common image gather depends on the migration velocity accuracy.

The shape of a feature related to a diffraction event in a dip angle common image gather is described by the following equation:

$$z_i(\alpha) = \frac{\gamma \cos(\alpha_i)(\gamma \Delta x \sin(\alpha_i) + D)}{1 - \gamma^2 \sin^2(\alpha_i)},$$

$$D = \sqrt{(z^2(1 - \gamma^2 \sin^2(\alpha) + \Delta x^2)}$$

where $z_i$ represents the depth of the image, $\alpha_i$ represents the current dip, $\Delta x$ represents the lateral distance between a diffractor and an observation point and $\gamma$ characterizes migration velocity accuracy and is equal to $V_m/V$ where Vm is the migration velocity and V is the medium velocity.

One aspect of the invention is to use the fact that reflection and diffraction events are represented by quite different features in the post-migrated dip-angle domain to separate them by a hybrid Radon transform.

In 26, a hybrid Radon transform is applied to the filtered common image gather to separate residues of the concave features from other image features related to diffraction events.

The hybrid Radon transform is based on a diffraction model $m_d$ and a reflection model $m_r$.

The diffraction model component is given by its analytical expression:

$$m_d(\gamma, \Delta x, z_i) = \sum_i d(\alpha_i, z = z_i(\gamma, \Delta x, \alpha_i))$$

whereas a reflection event is approximated, in the Radon domain, by an apex-shifted parabola $m_r$, wherein the curvature of the parabola is limited by minimum and maximum moveouts on far offsets.

To define the hybrid Radon transform that best fits the data in a least-squares sense, $m_r$ and $m_d$ are chosen so as to minimize an objective function F:

$$F(m_d, m_r) = \|L_d m_d + L_r m_r - d\|_2 + \epsilon_d \|W_d m_d\|_2 + \epsilon_r \|W_r m_r\|_2,$$

where $L_d$ and $L_r$ are diffraction and reflection Radon operators respectively, $W_d$ and $W_r$ are model space weights, $\epsilon_d$ and $\epsilon_r$ are diffraction and reflection measures of sparseness respectively and d represents data of the filtered common image gather.

According to an embodiment of the invention, a limited-memory quasi-Newton method is used to minimize the objective function F.

Figure 5:
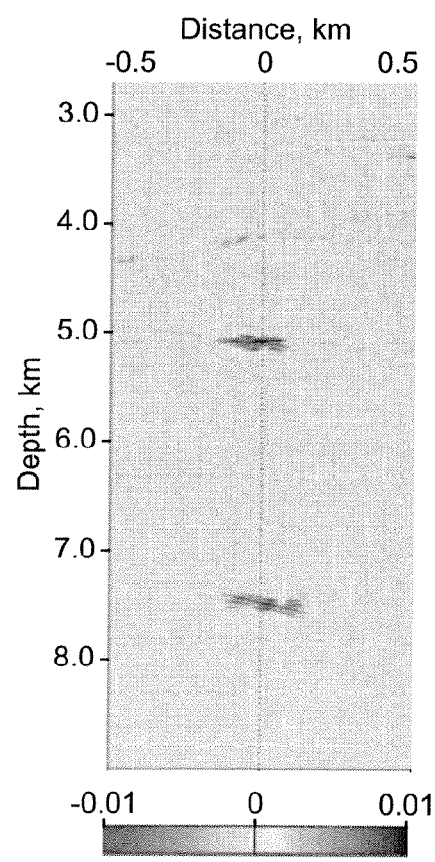
FIG. 5 is an image obtained after applying a hybrid Radon transform to the common image gather of FIG. 4.

FIG. 5 illustrates the result of the diffraction Radon transformation of the filtered common image gather of FIG. 4. Since the migration velocity is correct for this example, the diffraction model is restricted to one plane γ=1. The lateral distance Δx between the diffractor and the observation point is chosen ±500 m.

In 28, an inverse hybrid Radon transform is applied to the image containing the separated features related to diffraction events to obtain a transformed common image gather in the dip angle domain.

Figure 6:
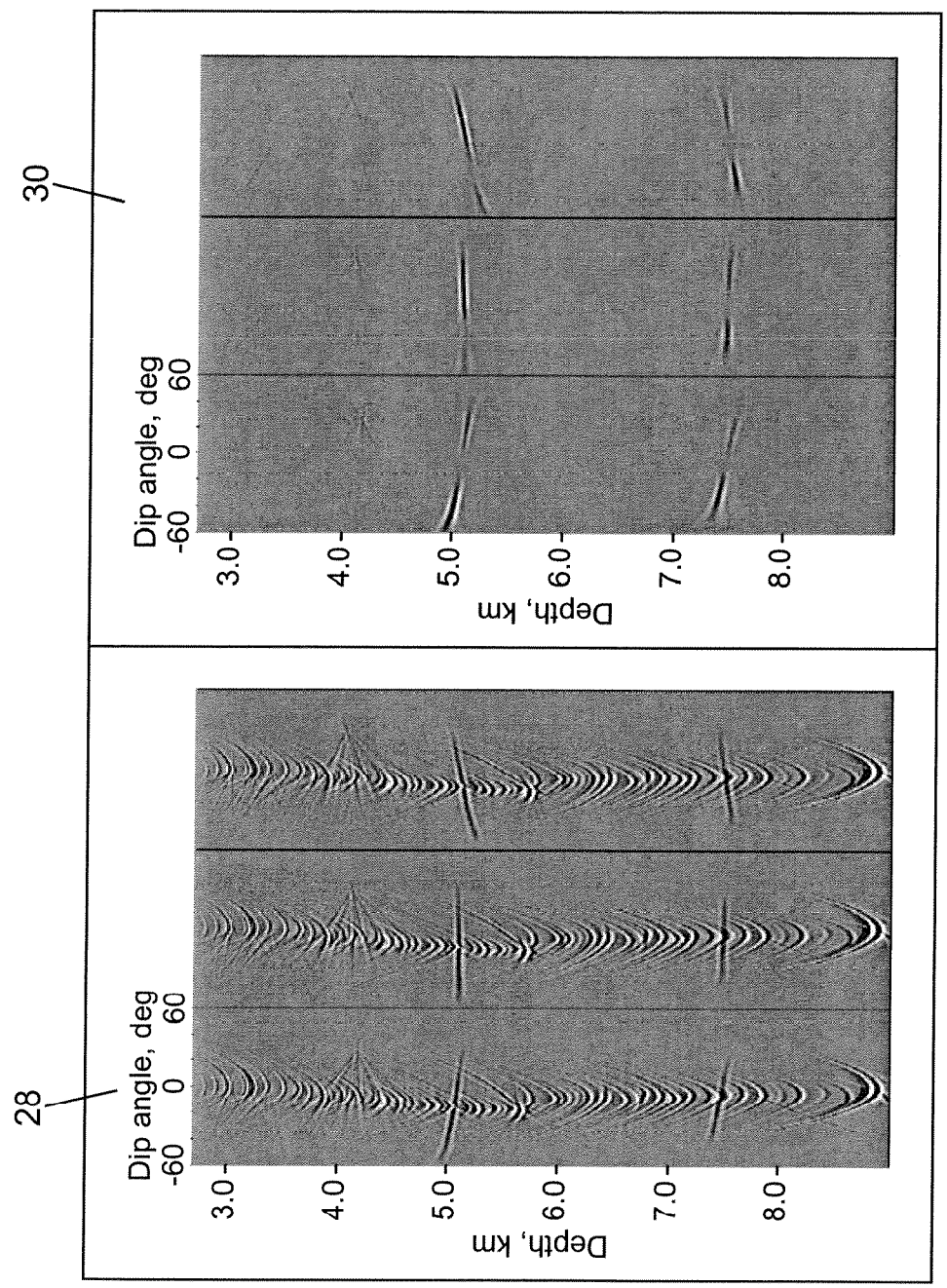
FIG. 6 shows common image gathers before and after applying the method for analyzing seismic data illustrated in FIG. 1.

Part 28 of FIG. 6 shows three neighbour common image gathers in the dip angle domain and part 30 shows the transformed common image gathers obtained by applying the method for analyzing seismic data of the invention. It is easy to notice, by observing part 30 of FIG. 6, that besides two point diffractors at depths of 5.1 and 7.5 km, weaker diffraction events are preserved such as the diffractor at depth 4 km.

Figure 7:
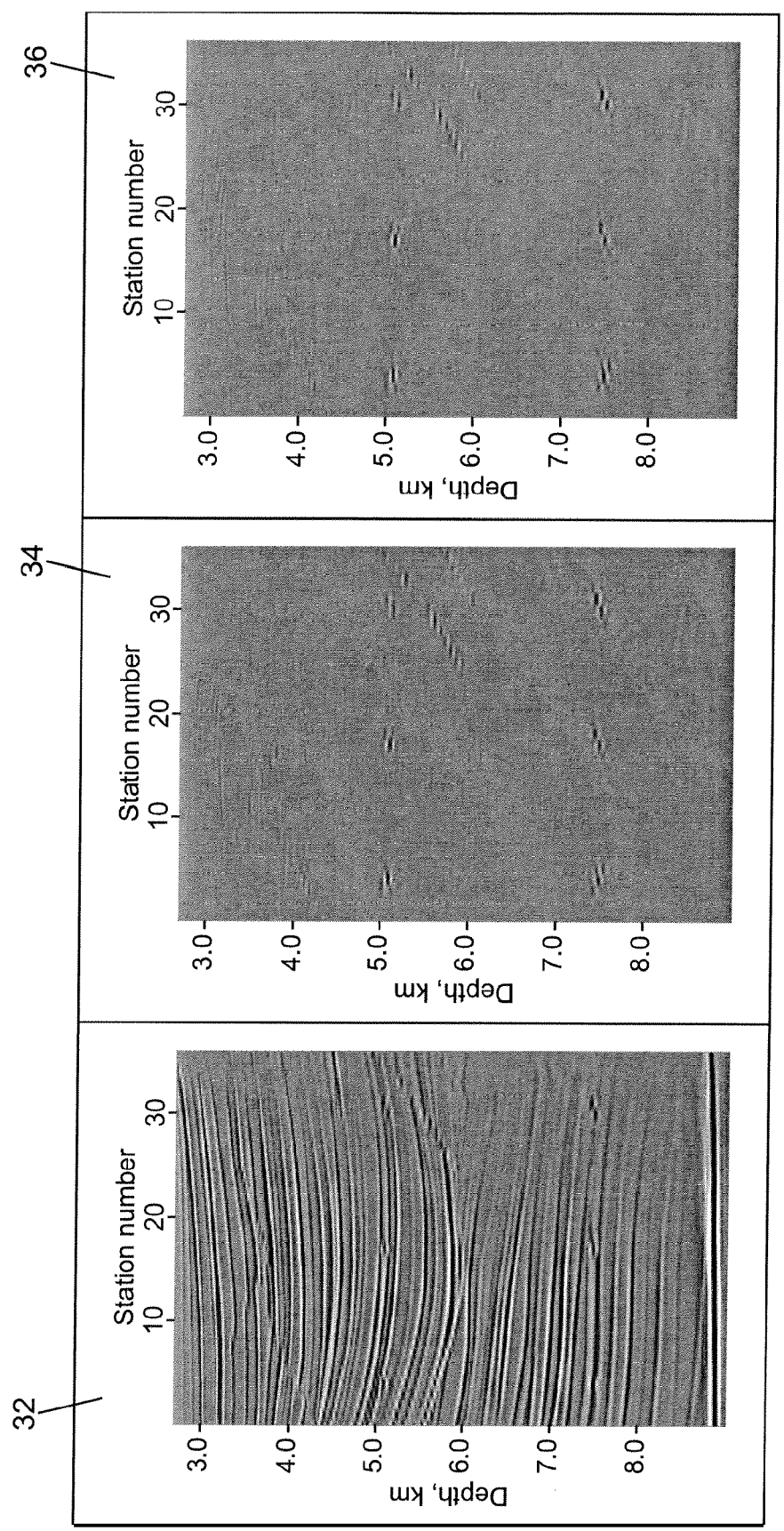
FIG. 7 shows seismic images before and after applying the method for analyzing seismic data illustrated in FIG. 1.

Part 32 of FIG. 7 shows conventional depth migration results of a processed part of seismic data. Results of depth imaging after the filtering step 24 and after the separation in the Radon domain (steps 26 and 28) are shown in parts 34 and 36 respectively. Six point diffractors are imaged very well. Besides, the image contains several strongly pronounced faults.

It is also remarkable that only the image, in part 34, constructed after the filtering has an acceptable quality, since all point diffractors and faults are imaged. The separation in the Radon domain enables to make the image clearer since it removes many artifacts.

In fact, the diffraction image (part 34) constructed by the summation of common image gathers after filtering out of part of the concave features in a vicinity of the detected apexes has a low computational cost but has relatively strong residual reflection events. This weakness is improved by applying a separation of reflexion and diffraction events in the hybrid Radon domain.

The application of the method of the invention to synthetic and real data illustrates the potential of using diffractions for imaging of small scale elements of the subsurface.

This method is advantageously implemented by a computer program for a system for analyzing seismic data when the program is executed by a computer for the system for analyzing seismic data.

The invention claimed is:

1. A method for analyzing seismic data, comprising:
   generating a post-migration common image gather in a dip angle domain from measured seismic data;
   detecting concave features related to reflection events in the common image gather and apexes of said concave features;
   filtering out part of the concave features in the common image gather in a vicinity of the detected apexes;
   applying a hybrid Radon transform to the filtered common image gather to separate residues of the concave features from other image features related to diffraction events;
   applying an inverse hybrid Radon transform to an image containing the separated features related to diffraction events to obtain a transformed common image gather in the dip angle domain.

2. The method according to claim 1, wherein the step of detecting apexes of concave features comprises:
   parameterizing each concave feature by an apex-shifted parabola; and
   searching positions corresponding to maximum semblance values for every dip angle and every depth sample.

3. The method according to claim 1, wherein the hybrid Radon transform is based on a diffraction model $m_d$ and a reflection model $m_r$.

4. The method according to claim 3, wherein the diffraction model $m_d$ and the reflection model $m_r$ are obtained by minimizing an objective function $$F(m_d, m_r) = \|L_d m_d + L_r m_r - d\|_2 + \epsilon_d \|W_d m_d\|_2 + \epsilon_r \|W_r m_r\|_2,$$

where $L_d$ and $L_r$ are diffraction and reflection Radon operators respectively, Wd and Wr are model space weights, $\epsilon_d$ and $\epsilon_r$ are diffraction and reflection measures of sparseness respectively, and d represents data of the filtered common image gather.

5. The method according to claim 4, wherein minimizing the objective function F uses a limited-memory quasi-Newton method.

6. A computer including at least one processor and a computer-readable storage medium for tangibly storing thereon an executable program for analyzing seismic data, the program comprising instructions for performing the steps of a method for analyzing seismic data when the program is executed by the computer wherein said steps comprise:
   generating a post-migration common image gather in a dip angle domain from measured seismic data;
   detecting concave features related to reflection events in the common image gather and apexes of said concave features;
   filtering out part of the concave features in the common image gather in a vicinity of the detected apexes;
   applying a hybrid Radon transform to the filtered common image gather to separate residues of the concave features from other image features related to diffraction events;
   applying an inverse hybrid Radon transform to an image containing the separated features related to diffraction events to obtain a transformed common image gather in the dip angle domain.

7. The computer-readable storage medium according to claim 6, wherein the step of detecting apexes of concave features comprises:
   parameterizing each concave feature by an apex-shifted parabola; and
   searching positions corresponding to maximum semblance values for every dip angle and every depth sample.

8. The computer-readable storage medium according to claim 6, wherein the hybrid Radon transform is based on a diffraction model $m_d$ and a reflection model $m_r$.

9. The computer-readable storage medium according to claim 8, wherein the diffraction model $m_d$ and the reflection model $m_r$ are obtained by minimizing an objective function $$F(m_d, m_r) = \|L_d m_d + L_r m_r - d\|_2 + \epsilon_d \|W_d m_d\|_2 + \epsilon_r \|W_r m_r\|_2,$$

where $L_d$ and $L_1$ are diffraction and reflection Radon operators respectively, Wd and Wr are model space weights, $\epsilon_d$ and $\epsilon_r$ are diffraction and reflection measures of sparseness respectively, and d represents data of the filtered common image gather.

10. The method according to claim 9, wherein minimizing the objective function F uses a limited-memory quasi-Newton method.

* * * * *